(12) United States Patent
Brolin

(10) Patent No.: US 7,630,638 B2
(45) Date of Patent: Dec. 8, 2009

(54) SHARED MULTI-LAMBDA SOURCE FOR WDM PON

(75) Inventor: Stephen J. Brolin, Livingston, NJ (US)

(73) Assignee: Fujitsu Limited, Kawasaki (JP)

(*) Notice: Subject to any disclaimer, the term of this patent is extended or adjusted under 35 U.S.C. 154(b) by 444 days.

(21) Appl. No.: 11/023,537

(22) Filed: Dec. 29, 2004

(65) Prior Publication Data
US 2006/0140631 A1 Jun. 29, 2006

(51) Int. Cl.
*H04J 14/00* (2006.01)
(52) U.S. Cl. .............................. 398/68; 398/66; 398/70
(58) Field of Classification Search .................... 398/42, 398/48, 79, 89, 66–72
See application file for complete search history.

(56) References Cited

U.S. PATENT DOCUMENTS

| | | | | |
|---|---|---|---|---|
| 5,504,609 A | * | 4/1996 | Alexander et al. | 398/91 |
| 5,559,624 A | * | 9/1996 | Darcie et al. | 398/72 |
| 5,559,858 A | * | 9/1996 | Beveridge | 379/56.2 |
| 5,870,216 A | * | 2/1999 | Brock et al. | 398/49 |
| 5,938,309 A | * | 8/1999 | Taylor | 398/79 |
| 5,995,256 A | * | 11/1999 | Fee | 398/34 |
| 6,388,782 B1 | * | 5/2002 | Stephens et al. | 398/79 |
| 6,768,827 B2 | * | 7/2004 | Yoo | 385/14 |
| 7,024,112 B2 | * | 4/2006 | Way | 398/51 |
| 7,142,788 B2 | * | 11/2006 | Price | 398/184 |
| 7,155,127 B2 | * | 12/2006 | Akimoto et al. | 398/72 |
| 7,450,850 B2 | * | 11/2008 | Combs et al. | 398/72 |
| 2002/0001114 A1 | * | 1/2002 | Farries | 359/123 |
| 2002/0097461 A1 | * | 7/2002 | Patel et al. | 359/110 |
| 2003/0090758 A1 | * | 5/2003 | Sparks et al. | 359/117 |
| 2003/0118312 A1 | * | 6/2003 | Sobel et al. | 385/135 |
| 2004/0246892 A1 | * | 12/2004 | Elie-Dit-Cosaque et al. | 370/216 |

* cited by examiner

*Primary Examiner*—Dalzid Singh
(74) *Attorney, Agent, or Firm*—Hanify & King, PC

(57) ABSTRACT

Shared optical carrier sources for the OLT's are provided. An apparatus comprises a plurality of optical carrier generators, each optical carrier generator outputting an optical carrier at a different wavelength, an optical multiplexer operable to combine the plurality of optical carriers to form a wave division multiplexed optical carrier, and an optical power splitter having a plurality of outputs, each output connectable to an optical line termination unit, the optical power splitter operable to split the wave division multiplexed optical carrier to form a plurality of wave division multiplexed optical carriers.

7 Claims, 15 Drawing Sheets

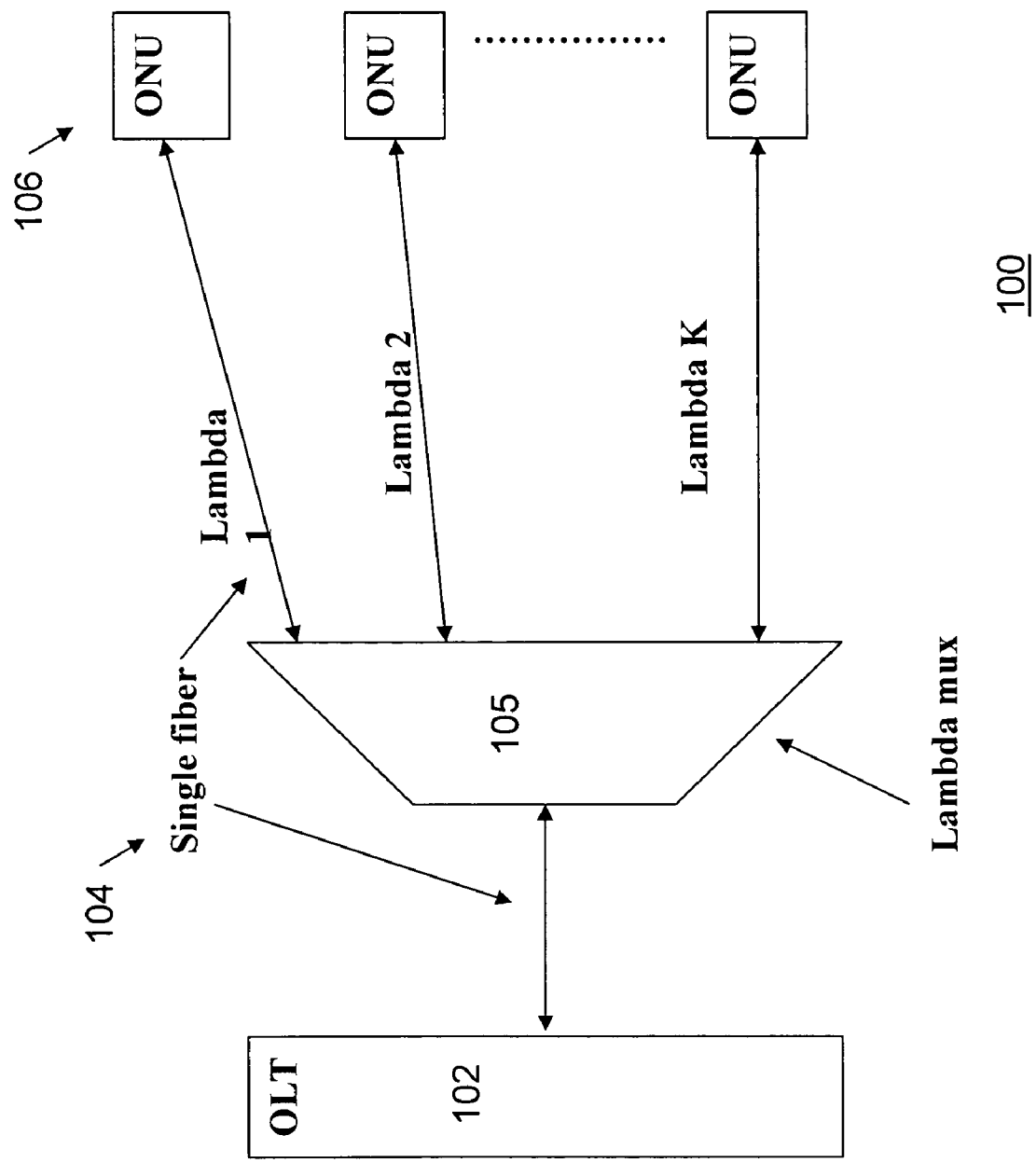

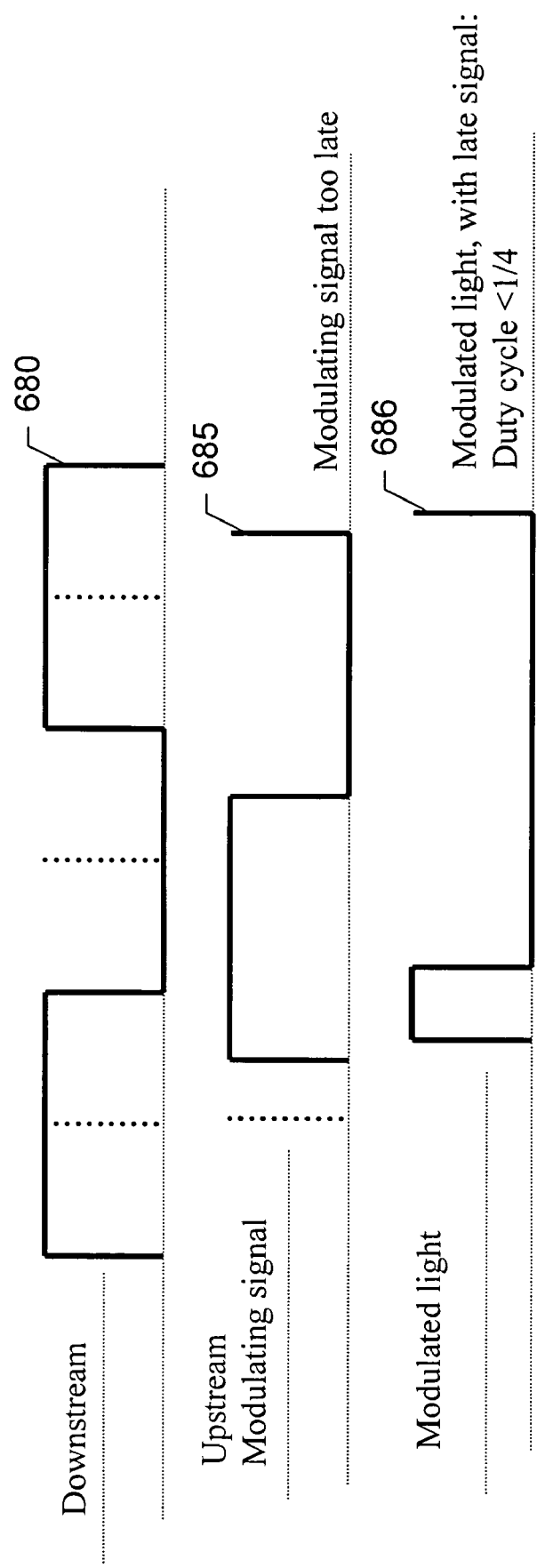

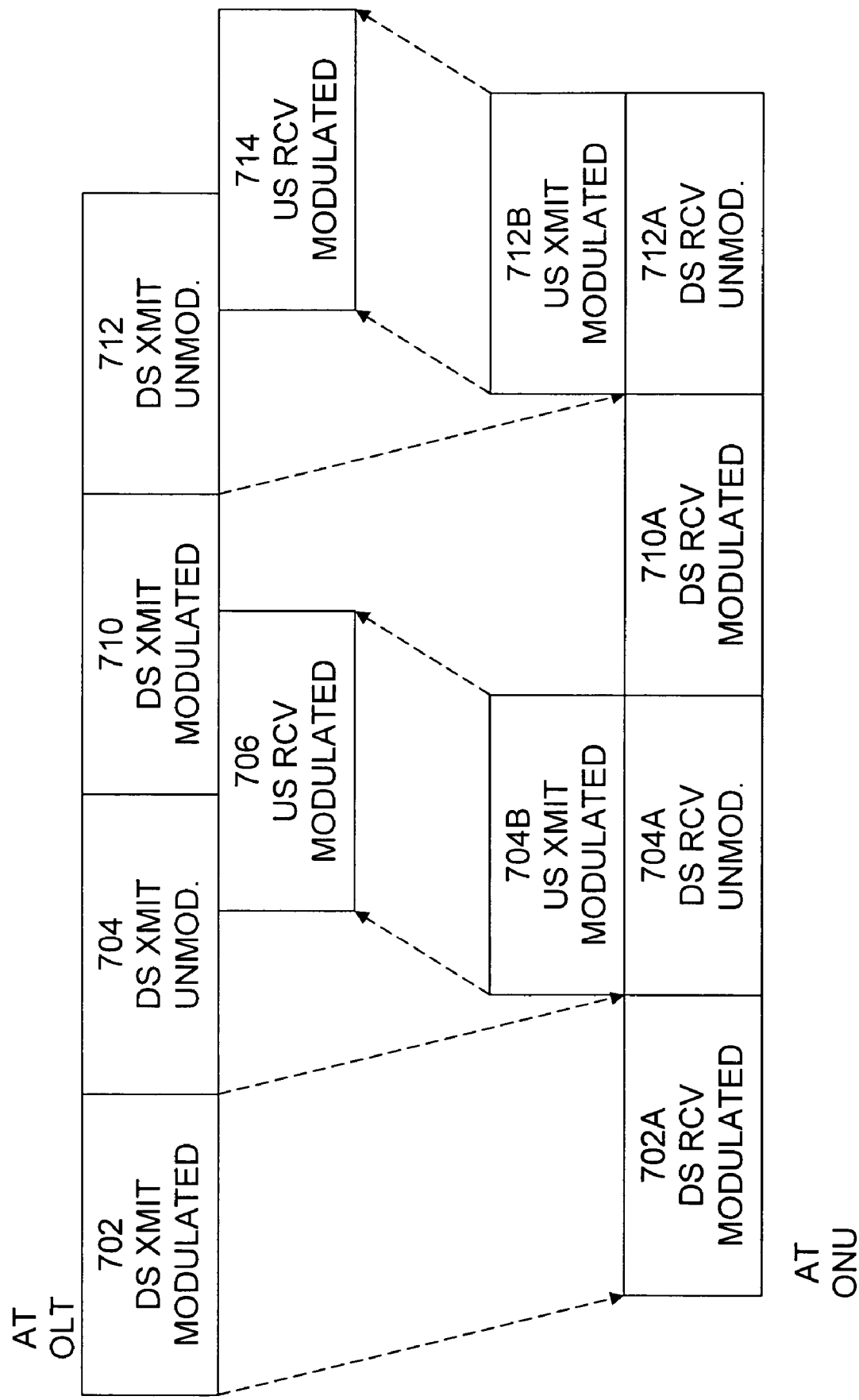

SHARED MULTI-LAMBDA SOURCE FOR WDM PON

BACKGROUND OF THE INVENTION

1. Field of the Invention

The present invention relates to an apparatus that eliminates the laser in an Optical Network Unit (ONU) in a Wave Division Multiplexed (WDM) Passive Optical Network (PON).

2. Description of the Related Art

Optical networks have become a standard technology for the transport of information in the telecommunications industry. A number of different optical network standards have been defined, with each having advantages and disadvantages for different uses. Synchronous optical network (SONET) is one standard for optical telecommunications transport. SONET is often used for long-haul, metro level, and access transport applications.

Another standard for optical telecommunications transport is passive optical networks (PONs). PONs are commonly used to address the last mile of the communications infrastructure between the service provider's central office, head end, or point of presence (POP) and business or residential customer locations. Also known as the access network or local loop, the last mile consists predominantly, in residential areas, of copper telephone wires or coaxial cable television (CATV) cables. In metropolitan areas, where there is a high concentration of business customers, the access network often includes high-capacity synchronous optical network (SONET) rings, optical T3 lines, and copper-based T1s.

Bandwidth is increasing dramatically on long-haul networks through the use of wavelength division multiplexing (WDM) and other new technologies. Recently, WDM technology has even begun to penetrate metropolitan-area networks (MAN), boosting their capacity dramatically. At the same time, enterprise local-area networks (LAN) have moved from 10 Mbps to 100 Mbps, and soon many LANs will be upgraded to gigabit Ethernet speeds. The result is a growing gulf between the capacity of metro networks on one side and end-user needs on the other, with the last-mile bottleneck in between.

PONs are one solution to this problem in an attempt to break the last-mile bandwidth bottleneck that other access network technologies do not adequately and economically address.

Important parts of the PON architecture are the Optical Network Unit (ONU) and the Optical Line Termination (OLT), which are active network elements located at end points of a PON. The OLT provides an interface for data to be transmitted over the PON. The ONU provides an interface between the customer's data, video, and telephony networks and the PON. The primary function of the ONU is to receive traffic in an optical format and convert it to the customer's desired format. Many PONs use wavelength division multiplexing (WDM) of multiple signals over each optical fiber. WDM PON provides dedicated optical wavelengths in each direction, for each ONU. This provides improved operations over other types of PON, where the same wavelength(s) are shared by up to 32 (or more) ONU's. However, a typical implementation of WDM PON requires a tuned narrowband laser in the ONU, and a fixed narrowband laser in the OLT dedicated to each ONU. This results in too costly an implementation for access applications. Most PON's today aren't based on WDM PON due to cost, they are APON, EPON, etc where ONU's share wavelengths in both directions. Thus, a need arises for a technique that can both eliminate tuned lasers in the ONU's and also provide shared optical carrier sources for the OLT's.

SUMMARY OF THE INVENTION

Shared Multi-Lambda Source For WDM PON

The present invention eliminates tuned lasers in the ONU's and also provide shared optical carrier sources for the OLT's.

In one embodiment of the present invention, an apparatus comprises a plurality of optical carrier generators, each optical carrier generator outputting an optical carrier at a different wavelength, an optical multiplexer operable to combine the plurality of optical carriers to form a wave division multiplexed optical carrier, and an optical power splitter having a plurality of outputs, each output connectable to an optical line termination unit, the optical power splitter operable to split the wave division multiplexed optical carrier to form a plurality of wave division multiplexed optical carriers.

In one aspect of the present invention, each optical carrier generator comprises a narrowband laser. The apparatus further comprises an optical amplifier operable to amplify at least one of the plurality of wave division multiplexed optical carriers. The apparatus further comprises a protection switch operable to provide switching between working and protect optical WDM carriers. At least some of the optical line termination unit are in separate physical enclosures.

Avoiding ONU Laser by Optical Modulation and Remodulation

The present invention eliminates tuned lasers in the ONU's and also provides shared optical carrier sources for the OLT's.

In one embodiment of the present invention, a method of communicating over a passive optical network comprises generating an optical signal modulated with a first data signal at a first network element, transmitting the modulated optical signal over the passive optical network from the first network element to a second network element, remodulating the received modulated optical signal with a second data signal at the second network element, and transmitting the remodulated optical signal from the second network element to the first network element.

In one embodiment of the present invention, an apparatus for communicating over a passive optical network comprises a transmitting portion operable to generate an optical signal modulated with a first data signal and to transmit the modulated optical signal over the passive optical network and a receiving portion operable to receive an optical signal comprising the transmitted optical signal remodulated with a second data signal.

In one aspect of the present invention, the transmitting portion comprises an optical modulator operable to modulate an unmodulated optical signal with the first data signal. The first data signal comprises a line code signal having a symbol rate greater than a symbol rate of the first data. The receiving portion comprises an optical demodulator operable to demodulate the received optical signal to recover the second data signal.

In one embodiment of the present invention, an apparatus for communicating over a passive optical network comprises a receiving portion operable to receive an optical signal modulated with a first data signal over the passive optical network, a remodulating portion operable to remodulate the received optical signal with a second data signal, and a transmitting portion operable to transmit the remodulated optical signal over the passive optical network.

In one aspect of the present invention, the receiving portion comprises a power splitter operable to split the received optical signal between the receiving portion and the remodulating portion and a line code demodulator operable to detect the first data signal from the received optical signal. The optical signal modulated with the first data signal comprises a training interval and the line code demodulator further comprises a framing device operable to identify the training interval. The receiving portion further comprises circuitry operable to output a signal phase locked to the training interval signal that is locked to the downstream frame and clock identified by the framing device.

In one aspect of the present invention, the remodulating portion comprises a line code modulator operable to remodulate the received optical signal with a second data signal based on the signal phase locked to the training interval signal. The remodulating portion comprises a line code modulator operable to remodulate the received optical signal with a second data signal In one aspect of the present invention, the transmitting portion comprises an optical amplifier operable to amplify the remodulated optical signal.

In one embodiment of the present invention, an apparatus for communicating over a passive optical network comprises a beamsplitter operable to split a received optical signal between a receiving portion and a remodulating portion, a remodulating portion operable to remodulate the received optical signal with a second data signal, and a photodetector operable to detect the first data signal from the received optical signal.

In one aspect of the present invention, the remodulating portion comprises a silicon optical amplifier reflective operable to receive the modulated optical signal from the beamsplitter, to remodulate the received optical signal with the second data signal, and to reflect the remodulated optical signal back to the beamsplitter.

Eliminating ONU Laser for WDM PON by Burst Mode

The present invention eliminates tuned lasers in the ONU's and also provides shared optical carrier sources for the OLT's.

In one embodiment of the present invention, a method of communicating over a passive optical network comprises generating at a first network element an optical signal comprising a first portion modulated with a first data signal and a second portion that is unmodulated, transmitting the optical signal over the passive optical network from the first network element to a second network element, modulating the second portion of the received optical signal with a second data signal at the second network element, and transmitting the modulated second portion of the received modulated optical signal from the second network element to the first network element.

In one embodiment of the present invention, an apparatus for communicating over a passive optical network comprises a transmitting portion operable to generate an optical signal comprising a first portion modulated with a first data signal and a second portion that is unmodulated and to transmit the optical signal over the passive optical network and a receiving portion operable to receive an optical signal comprising the second portion of the transmitted optical signal modulated with a second data signal.

In one aspect of the present invention, the transmitting portion comprises an optical modulator operable to modulate the first portion of an unmodulated optical signal with the first data signal and to not modulate the second portion of the unmodulated optical signal.

In one aspect of the present invention, the receiving portion comprises an optical demodulator operable to demodulate the received optical signal to recover the second data signal.

In one embodiment of the present invention, an apparatus for communicating over a passive optical network comprises a receiving portion operable to receive an optical signal comprising a first portion modulated with a first data signal and a second portion that is unmodulated over the passive optical network, a modulating portion operable to modulate the second portion of the received optical signal with a second data signal to form a second optical signal, and a transmitting portion operable to transmit the second optical signal over the passive optical network.

In one aspect of the present invention, the receiving portion comprises a power splitter operable to split the received optical signal between the receiving portion and the remodulating portion and a demodulator operable to detect the first data signal from the received optical signal. The demodulator further comprises a framing device operable to identify the second portion of the received optical signal.

In one aspect of the present invention, the modulating portion comprises a modulator operable to modulate the second portion of the received optical signal with a second data signal based on the identification of the second portion of the received optical signal from the framing device. The transmitting portion comprises an optical amplifier operable to amplify the second optical signal.

In one embodiment of the present invention, an apparatus for communicating over a passive optical network comprises a beamsplitter operable to split a received optical signal between a receiving portion and a modulating portion, the received optical signal comprising a first portion modulated with a first data signal and a second portion that is unmodulated, a modulating portion operable to modulate the second portion of the received optical signal with a second data signal to form a second optical signal, and a photodetector operable to detect the first data signal from the received optical signal.

In one aspect of the present invention, the modulating portion comprises a silicon optical amplifier reflective operable to receive the second portion of the optical signal from the beamsplitter, to modulate the second portion of the optical signal with the second data signal to form the second optical signal, and to reflect the second optical signal back to the beamsplitter.

BRIEF DESCRIPTION OF THE DRAWINGS

FIG. 1a is an exemplary block diagram of a WDM PON system, in which the present invention may be implemented.

FIG. 6e is an exemplary illustration of a downstream training signal used for phase locking in an embodiment of the present invention.

FIG. 7 is an exemplary format of signals that may be used in an embodiment of the present invention.

DETAILED DESCRIPTION OF THE PREFERRED EMBODIMENTS

An exemplary PON system 100, in which the present invention may be implemented, is shown in FIG. 1a. One or more Optical Line Termination Units (OLTs) 102 provide the interface with data to be transmitted over the Optical Distribution Network (ODN) 104 to the Optical Network Unit (ONU) 106 portion of the PON. The passive elements of the PON are located in ODN 104 and may include single-mode fiber-optic cable, and passive optical devices such as splitters/couplers, connectors, multiplexers, and splices. In the example shown in FIG. 1a, ODN 104 includes lambda multiplexer 105 and a number of optical fibers.

The ONU 106 portion of the PON includes one or more ONUs that provide the interface between the customer's data, video, and telephony networks and the PON. The primary function of an ONU is to receive traffic in an optical format and convert it to the end user's desired format and to receive traffic from the end user and convert it to an optical format. Alternatively, the end user's format is typically an electrical format, such as Ethernet, IP multicast, POTS, T1, etc., but the end user's format may be an optical format, such as SONET/SDH.

Figure 1B:
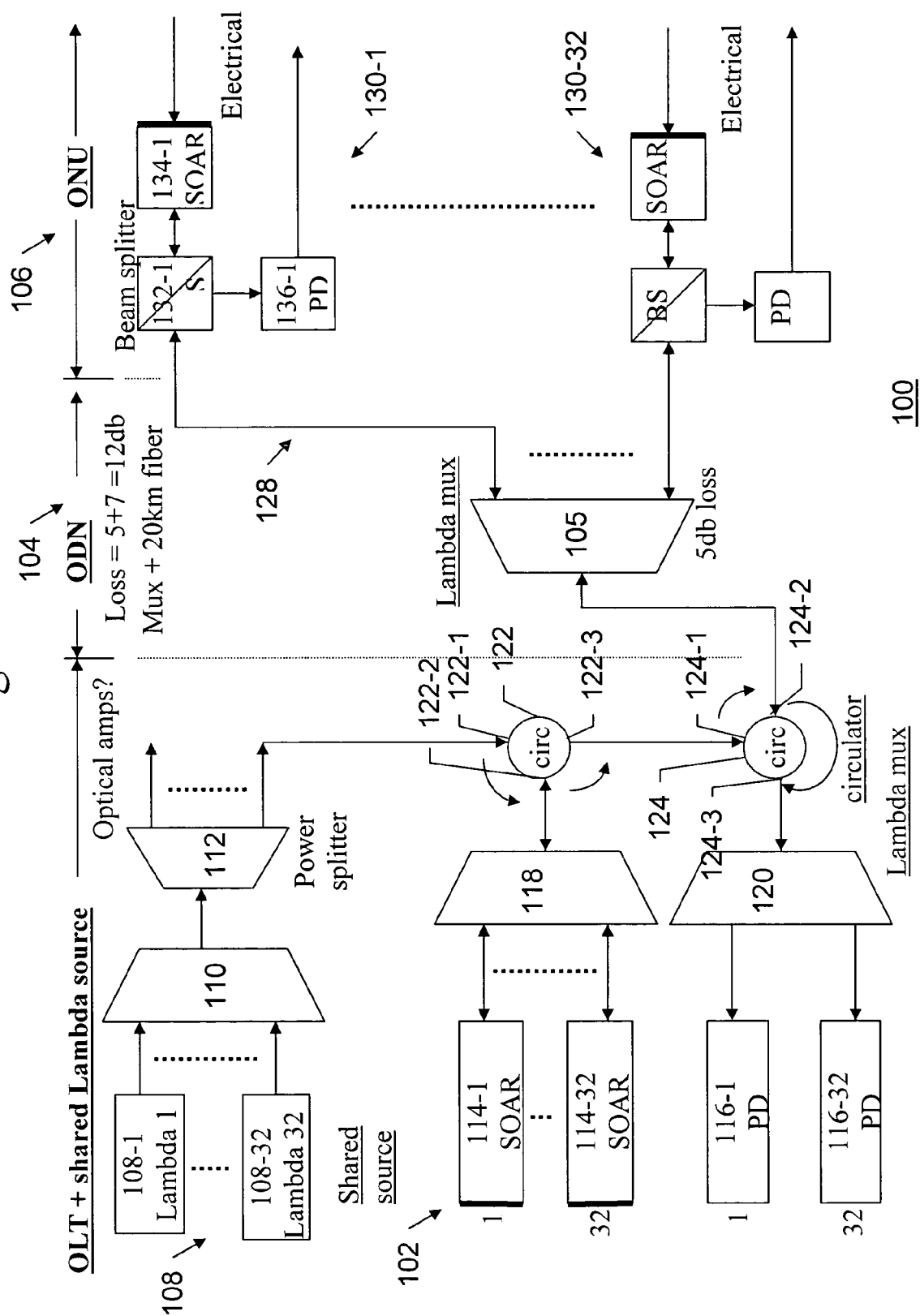
FIG. 1b is an exemplary block diagram of a WDM PON system, in which the present invention may be implemented.

The exemplary PON system 100, in which the present invention may be implemented, is shown in more detail in FIG. 1b. OLT 102 includes or is connected to a shared lambda source 108. Shared lambda source 108 includes a plurality of single wavelength optical carrier generators such as optical carrier generators 108-1 to 108-32. Each optical carrier generator outputs an optical carrier at a different wavelength. In the example shown in FIG. 1b, there are 32 optical carrier generators shown as an example. However, the present invention contemplates usage of any number of optical carrier generators. The optical carrier generators are typically narrowband lasers. Shared lambda source 108 also includes lambda multiplexer 110, which multiplexes the plurality of optical carriers from optical carrier generators 108-1 to 108-32 onto a single optical fiber, to form a wavelength division multiplex (WDM) carrier on the optical fiber. Shared lambda source 108 also includes optical power splitter 112, which splits the WDM carrier into a plurality of WDM carrier, each of which may be used by a particular PON. Optionally, optical amplifiers may be used to amplify the plurality of WDM carrier, if higher WDM carrier amplitude is needed for a particular application. Optical amplifiers are typically used to compensate for losses incurred in the power splitters. In addition, if shared source 108 is used to provide a WDM carrier to multiple OLTs in different physical enclosures, then preferably shared source 108 includes a protection switch to provide switching between the working and protect optical WDM carriers. It is to be noted that the need for protection may apply even if shared source 108 and the OLTs are in the same location. Typically, shared lambda source 108 provides optical carriers having wavelengths in a range from 1525 to 1565 nm. However, this is merely an example. The present invention contemplates operations over any range of optical wavelengths.

OLT 102 includes a plurality of Semiconductor Optical Amplifier Reflective (SOAR) devices 114-1 to 114-32, a plurality of photodetector circuits 116-1 to 116-32, lambda multiplexers 118 and 120, and optical circulators 122 and 124. A WDM carrier from one tap of optical power splitter 112 is input to input 122-1 of optical circulator 122. The WDM carrier is circulated from input 122-1 to input/output 122-2, where the WDM carrier is output to lambda multiplexer/demultiplexer 118. The WDM carrier is demultiplexed by lambda multiplexer/demultiplexer 118 and separated into a plurality of narrow wavelength carriers. Each narrow wavelength carrier is input to a SOAR device 114-1 to 114-32, where it is modulated with data to be transmitted over the PON. A modulated narrow wavelength signal is output from each SOAR device 114-1 to 114-32 and input to lambda multiplexer/demultiplexer 118. These may be termed the OLT modulated signals. The input OLT modulated signals are multiplexed in lambda multiplexer/demultiplexer 118 to form a modulated WDM signal. This may be termed the OLT WDM signal. The OLT WDM signal is output from lambda multiplexer/demultiplexer 118 and input to input/output 122-2 of optical circulator 122. The OLT WDM signal is circulated in optical circulator 122 and output from output 122-3 of optical circulator 122. The OLT WDM signal is input to input 124-1 of optical circulator 124, circulated and output from input/output 124-2 of optical circulator 124. The OLT WDM signal is carried via ODN 104 to the ONU 106 portion of the PON.

The modulation present in the OLT modulated signals varies in different embodiments of the present invention. In some embodiments, the narrow wavelength signal is not modulated 100% of the time, but rather, unmodulated or continuous-wave (CW) portions of the narrow wavelength signal may be output from one or more SOAR devices 114-1 to 114-32. For simplicity, the signal output from a SOAR device in the OLT is referred to as an OLT modulated signal, even if it includes unmodulated or CW portions.

A second modulated WDM signal is also carried via ODN 104 from the ONU 106 portion of the PON to OLT 102. This second modulated WDM signal is termed the ONU WDM signal. The ONU WDM signal is input to input 124-2 of optical circulator 124, circulated and output from output 124-3 of optical circulator 124. The second ONU WDM signal is demultiplexed by lambda multiplexer/demultiplexer 120 and separated into a plurality of modulated narrow wavelength signals. Each modulated narrow wavelength signal is input to a photodetector 116-1 to 116-32, where the data modulated onto the signal is detected. Each photodetector outputs an electrical signal carrying the data stream extracted from its input modulated narrow wavelength signal.

ODN 104 includes the passive elements of one or more PONs. ODN 104 may include single-mode fiber-optic cable, and passive optical devices such as splitters/couplers, connectors, multiplexers, and splices. Active network elements, such as OLT 102 and the ONU 106 portion of the PON, are located at the end points of the PON. Optical signals traveling across the PON are either split onto multiple fibers or combined onto a single fiber by optical splitters/couplers, depending on whether the light is traveling up or down the PON. The PON is typically deployed in a single-fiber, point-to-multi-point, tree-and-branch configuration for residential applications. OLTs may also be connected in a protected ring architecture for business applications or in a bus architecture for campus environments and multiple-tenant units (MTU).

As shown in FIG. 1b, ODN 104 includes lambda multiplexer/demultiplexer 105 and a plurality of optical fibers 128. Lambda multiplexer/demultiplexer 105 receives a modulated WDM signal from OLT 102 and demultiplexes it to from a plurality of modulated narrow wavelength signals, each of which is transmitted over an optical fiber 128. Likewise, lambda multiplexer/demultiplexer 105 receives a modulated narrow wavelength signal from each optical fiber 128 and multiplexes them to form a modulated WDM signal that is transmitted to OLT 102. In this way, ODN 104 provides bi-directional optical communications paths.

The ONU 106 portion of the PON includes one or more ONUs 130-1 to 130-32. Each modulator/detector unit, such as modulator detector unit 130-1, includes a beam splitter 132-1, a SOAR device 134-1, and a photodetector 136-1. Beam splitter 132 is an optical device that splits a beam of light in two. In its most common form, it is a cube, made from two triangular glass prisms that are glued together at their base using a resin. The thickness of the resin layer is adjusted such that approximately half of the light incident through one "port" (i.e. face of the cube) is reflected and the other half is transmitted. Another possible design is the use of a "half-silvered mirror". This is a plate of glass with a thin coating of silver (usually deposited from silver vapor) with the thickness of the silver coated such that of light incident at a 45 degree angle, one half is transmitted and one half it reflected. Instead of a silver coating, a dielectric optical coating may be used instead. In order to be usable with the present invention, beamsplitter 132 must work over the range of optical wavelengths generated by the OLT, since the same ONU may be connected to any of the wavelengths generated by the OLT.

An OLT modulated signal, which is a modulated narrow wavelength signal generated in OLT 102, is output from an optical fiber, such as fiber 128 and is input to a beam splitter, such as beam splitter 132-1. A portion of the OLT modulated signal is output to SOAR device 134-1 and a portion of the OLT modulated signal is output to photodetector 136-1. The data modulated onto the OLT modulated signal is detected by photodetector 136-1. Each photodetector outputs an electrical signal carrying the data stream extracted from its input OLT modulated signal. Thus, photodetector 136-1 extracts the data transmitted over one wavelength of one fiber of the PON from OLT 102 to ONU 106.

The OLT modulated signal is also input to SOAR device 134-1. As noted above, the modulated narrow wavelength signal may include some unmodulated or CW portions. These unmodulated or CW portions of the OLT modulated signal are modulated in the SOAR device 134-1 based on input electrical signals that carry data to be modulated onto the optical signal. The portions of an OLT modulated signal that are modulated by SOAR device 134-1 are termed an ONU modulated signal. The ONU modulated signal is output from SOAR device 134-1, passes through beam splitter 132-1, and is transmitted over optical fiber 128 to lambda multiplexer/demultiplexer 105. The plurality of ONU modulated signals from modulator detector units 130-1 to 130-32 are multiplexed by lambda multiplexer/demultiplexer 105 to form a WDM signal termed the ONJ WDM signal. As described above, the ONU WDM signal is input to input 124-2 of optical circulator 124, circulated and output from output 124-3 of optical circulator 124. The second ONU WDM signal is demultiplexed by lambda multiplexer/demultiplexer 120 and separated into a plurality of modulated narrow wavelength signals. Each modulated narrow wavelength signal is input to a photodetector 116-1 to 116-32, where the data modulated onto the signal is detected. Each photodetector outputs an electrical signal carrying the data stream extracted from its input modulated narrow wavelength signal.

Figure 2:
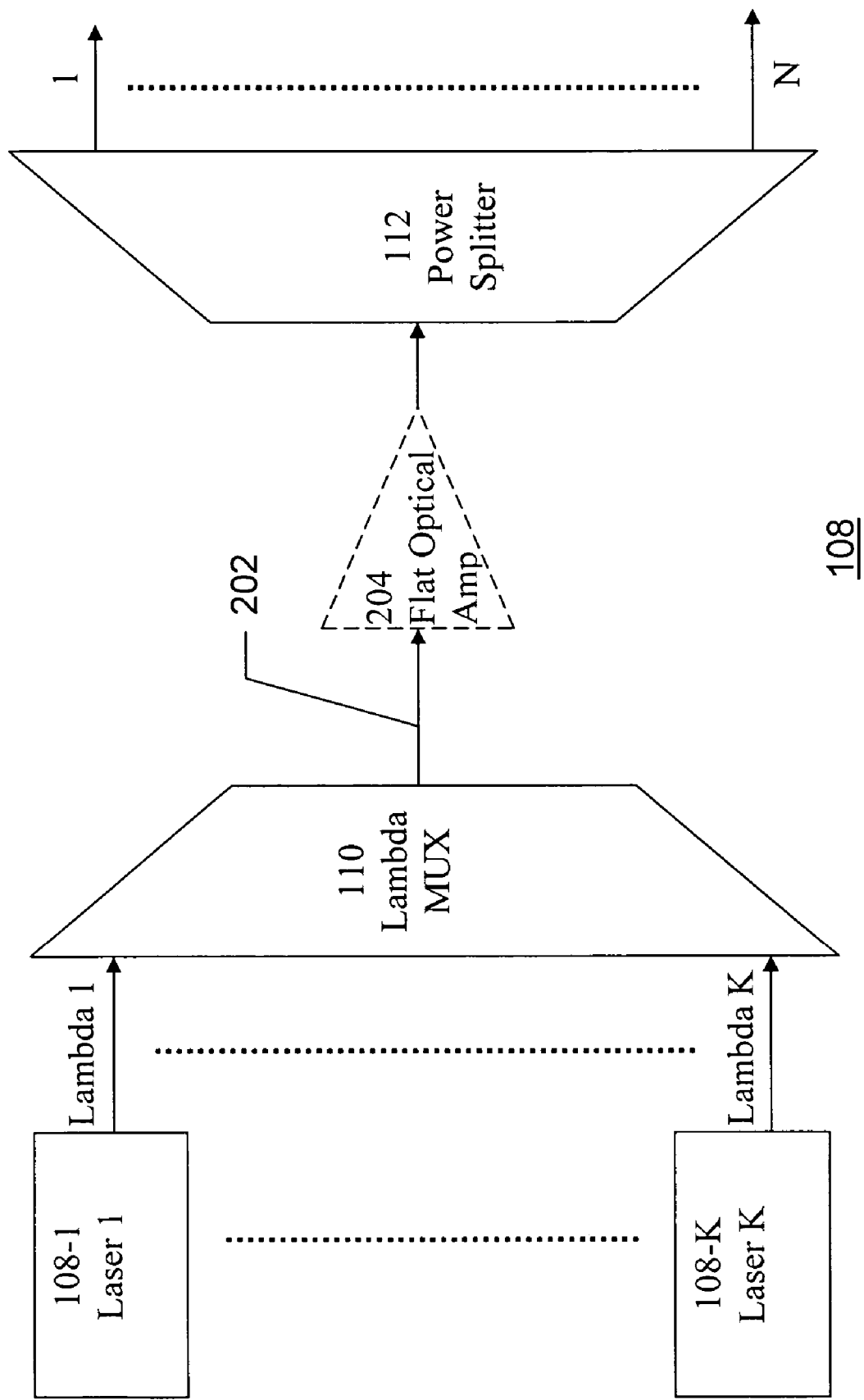
FIG. 2 is an exemplary block diagram of a shared lambda source shown in FIG. 1b.

An example of a shared lambda source 108 is shown in FIG. 2. Shared lambda source 108 includes a plurality of single wavelength optical carrier generators such as optical carrier generators 108-1 to 108-K. In the example shown in FIG. 2, there are K optical carrier generators shown as an example. However, the present invention contemplates usage of any number of optical carrier generators. The optical carrier generators are typically narrowband lasers. Shared lambda source 108 also includes lambda multiplexer 110, which multiplexes the plurality of optical carriers from optical carrier generators 108-1 to 108-K onto a single optical fiber 202, to form a wavelength division multiplexed (WDM) carrier on the optical fiber 202. Shared lambda source 108 also includes optical power splitter 112, which splits the WDM carrier into a plurality of WDM carriers, each of which may be routed to an OLT. In the example shown in FIG. 2, optical power splitter 112 routes the WDM carriers to N OLTs. However, the present invention contemplates routing to any number of OLTs. Optionally, optical amplifier 204 may be used to amplify the plurality of WDM carriers, if higher WDM carrier amplitude is needed for a particular application. Optical amplifier 204 is typically used to compensate for losses incurred in the power splitters. In addition, if shared source 108 is used to provide a WDM carrier to multiple OLTs in different physical enclosures, then preferably shared source 108 includes a protection switch to provide switching between the working and protect optical WDM carriers. It is to be noted that the need for protection may apply even if shared source 108 and the OLTs are in the same location. Typically, shared lambda source 108 provides optical carriers having wavelengths in a range from 1525 to 1565 nm. However, this is merely an example. The present invention contemplates operations over any range of optical wavelengths.

Figure 3:
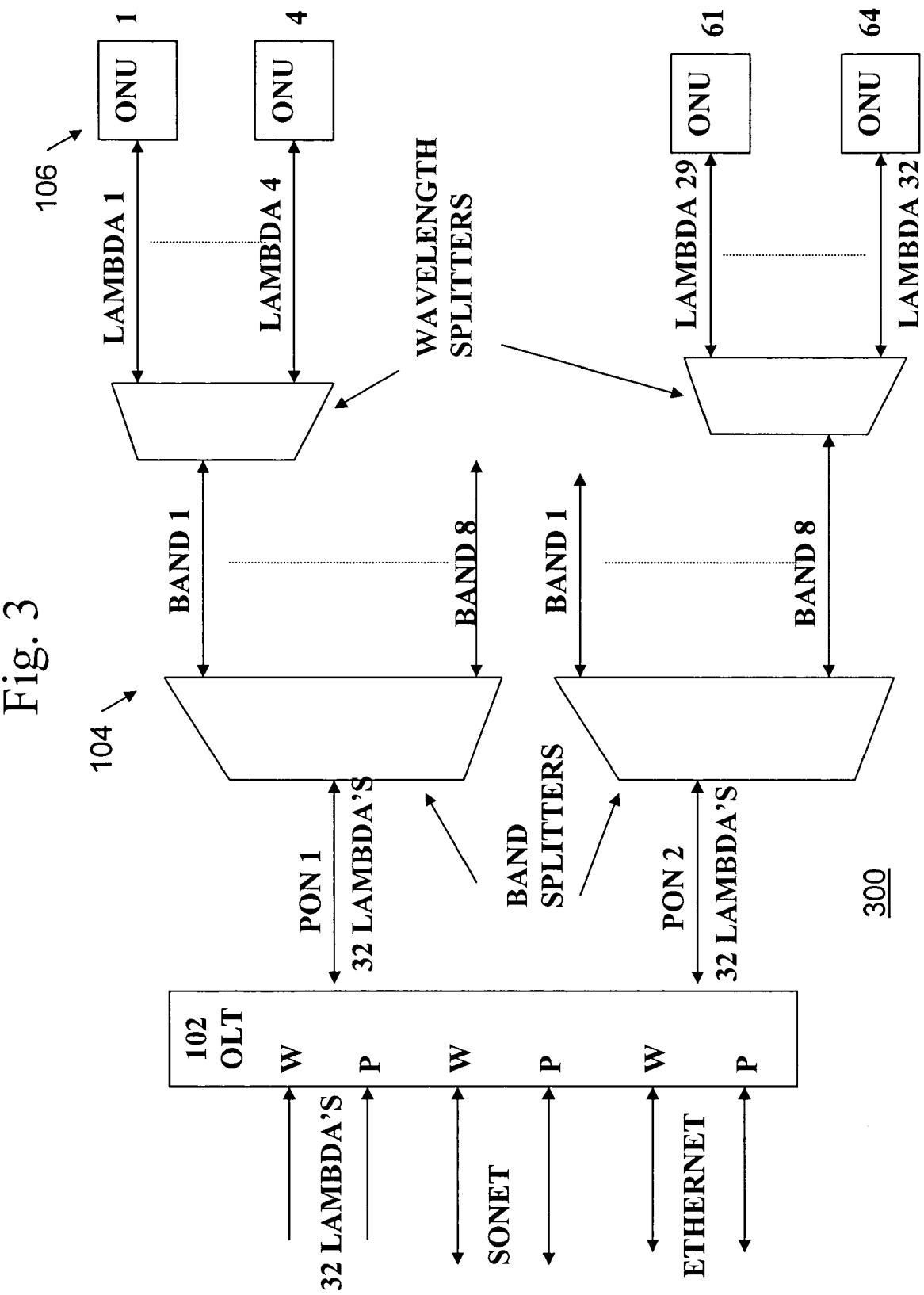
FIG. 3 is an exemplary block diagram of a PON system, in which the present invention may be implemented.

An exemplary PON system 300, in which the present invention may be implemented, is shown in FIG. 3. In this example, one or more OLTs 102 provide the interface with data to be transmitted over the Optical Distribution Network (ODN) 104 to the Optical Network Unit (ONU) 106 portion of the PON. OLT 102 provides interconnection with electrical networks, such as Ethernet, optical networks, such as SONET, and receives a plurality of optical carriers from a shared lambda source. The passive elements of the PON are located in ODN 104 and may include single-mode fiber-optic cable, and passive optical devices such as splitters/couplers, connectors, multiplexers, and splices. In the example shown in FIG. 1a, ODN 104 includes a plurality of cascaded lambda multiplexers and a number of optical fibers.

The ONU 106 portion of the PON includes one or more ONUs that provide the interface between the customer's data, video, and telephony networks and the PON. The primary function of an ONU is to receive traffic in an optical format and convert it to an electrical signal in the end user's desired format and to receive traffic as an electrical signal from the end user and convert it to an optical signal and format. Typically, the end user's format is an electrical format, such as Ethernet, IP multicast, POTS, T1, etc., but alternatively, the end user's format may be an optical format, such as Ethernet over fiber.

Figure 4:
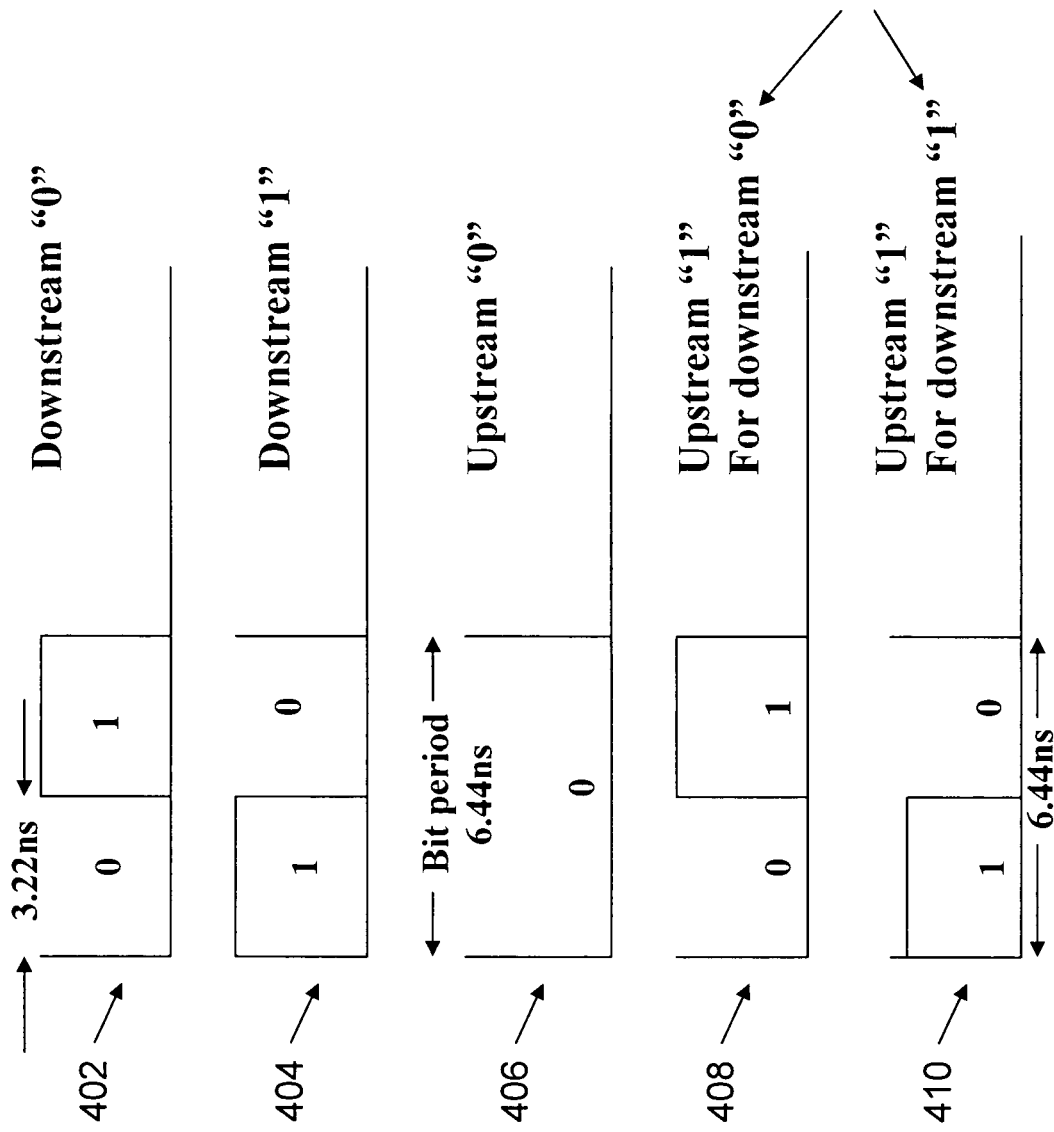
FIG. 4 is an exemplary format of a line code that may be used in an embodiment of the present invention.

As described above, the modulation performed in the OLT varies in different embodiments of the present invention. In one embodiment, the optical signal modulated in the OLT is transmitted to the ONU, where the modulated signal is remodulated and transmitted back to the OLT. The operation of this embodiment may be termed "modulation—remodulation". An example of the operation of modulation—remodulation is shown in FIG. 4. In this example, a downstream signal is modulated to carry data in the OLT and transmitted to the ONU. At the ONU, the data carried by the signal is recovered, and the downstream signal is remodulated to carry data to form an upstream signal that is transmitted to the OLT. At the OLT, the data carried by the upstream signal is recovered.

In the example shown in FIG. 4, a data bit "0" is modulated onto the downstream signal using a line code of "01" 402, while a data bit "1" is modulated onto the downstream signal using a line code of "10" 404. When the downstream signal is received at the ONU, the ONU remodulates the signal to carry upstream data. In this example, a data bit "0" is remodulated onto the upstream signal using a line code of "00" 406, while a data bit "1" is remodulated onto the upstream signal using a line code of "01" 408 or "10" 410. The upstream line code is obtained by multiplying the downstream line code by full bit period "0" (modulator switch off), or full bit period "1" (modulator switch on). Either "01" 408 or "10" 410 is read by the OLT as a "1" from the ONU.

It is seen that in this example, the downstream line code is twice the frequency of information bit rate. In this example, a 310 MHz line code, which provides a 155 Mbs data rate, is shown. It is to be noted that these rates and line codes are merely examples, the present invention is not limited to these rates and line codes. Rather, the present invention contemplates any and all rates and line codes for data transmission.

Figure 5:
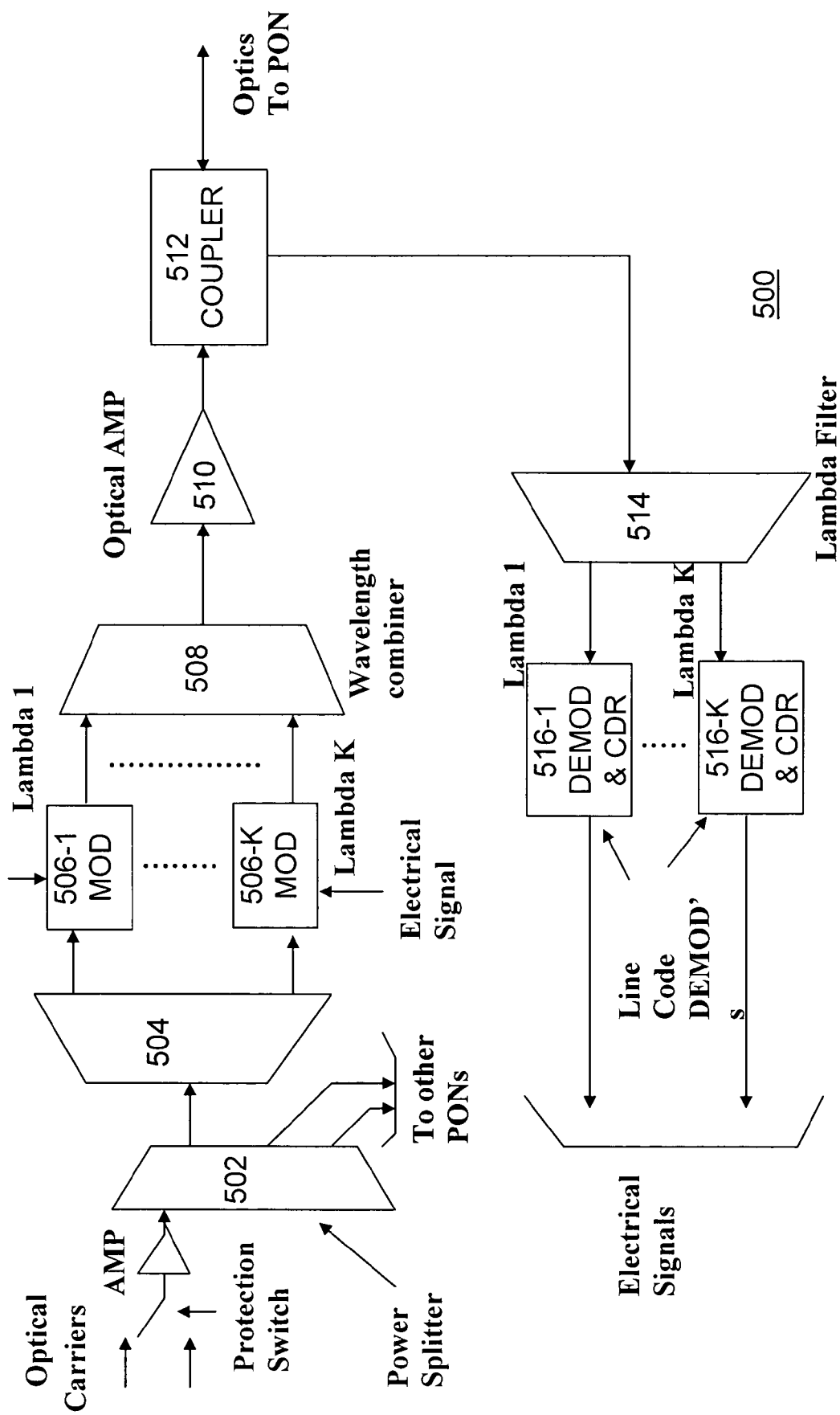
FIG. 5 is an exemplary block diagram of optical and electrical components in an OLT that that may be used to implement the present invention.

The modulation—remodulation technique may be implemented in the embodiment of the present invention shown in FIG. 1b. Likewise, the modulation—remodulation technique may be implemented in the embodiment of the present invention shown in FIG. 5, which is an exemplary block diagram of optical and electrical components in OLT 500.

OLT 500 includes an optical power splitter 502, a lambda demultiplexer 504, a plurality of optical modulators 506-1 to 506-K, a lambda multiplexer 508, an optical amplifier 510, an optical coupler 512, a lambda demultiplexer 514, and a plurality of optical demodulators/CDRs 516-1 to 516-K. An unmodulated WDM carrier (including a plurality of optical carriers) is input to optical power splitter 502, which splits the WDM carrier into a plurality of WDM carriers, each of which may be used by a particular PON. One or more optical amplifiers may be used to amplify the WDM carrier, if higher WDM carrier amplitude is needed for a particular application. In addition, since the WDM carrier is provided to multiple PONs, a protection switch is included to provide switching between the working and protect optical WDM carriers.

The unmodulated WDM carrier is input to lambda demultiplexer 504, which separates the signal into a plurality of narrow wavelength carriers. Each narrow wavelength signal is input to an optical modulator 506-1 to 506-K, where it is modulated with data to be transmitted over the PON. A modulated narrow wavelength signal is output from each optical modulator 506-1 to 506-K and input to lambda multiplexer 508. These may be termed the OLT modulated signals. The input OLT modulated signals are multiplexed in lambda multiplexer 508 to form a modulated WDM signal. This may be termed the OLT WDM signal. The OLT WDM signal is output from lambda multiplexer 508 and input to optical amplifier 510, where the signal is amplified for transmission over the optical fiber. The amplified signal is input to optical coupler 512, where it is coupled onto the optical fiber for transmission to the ONU.

Figure 6A:
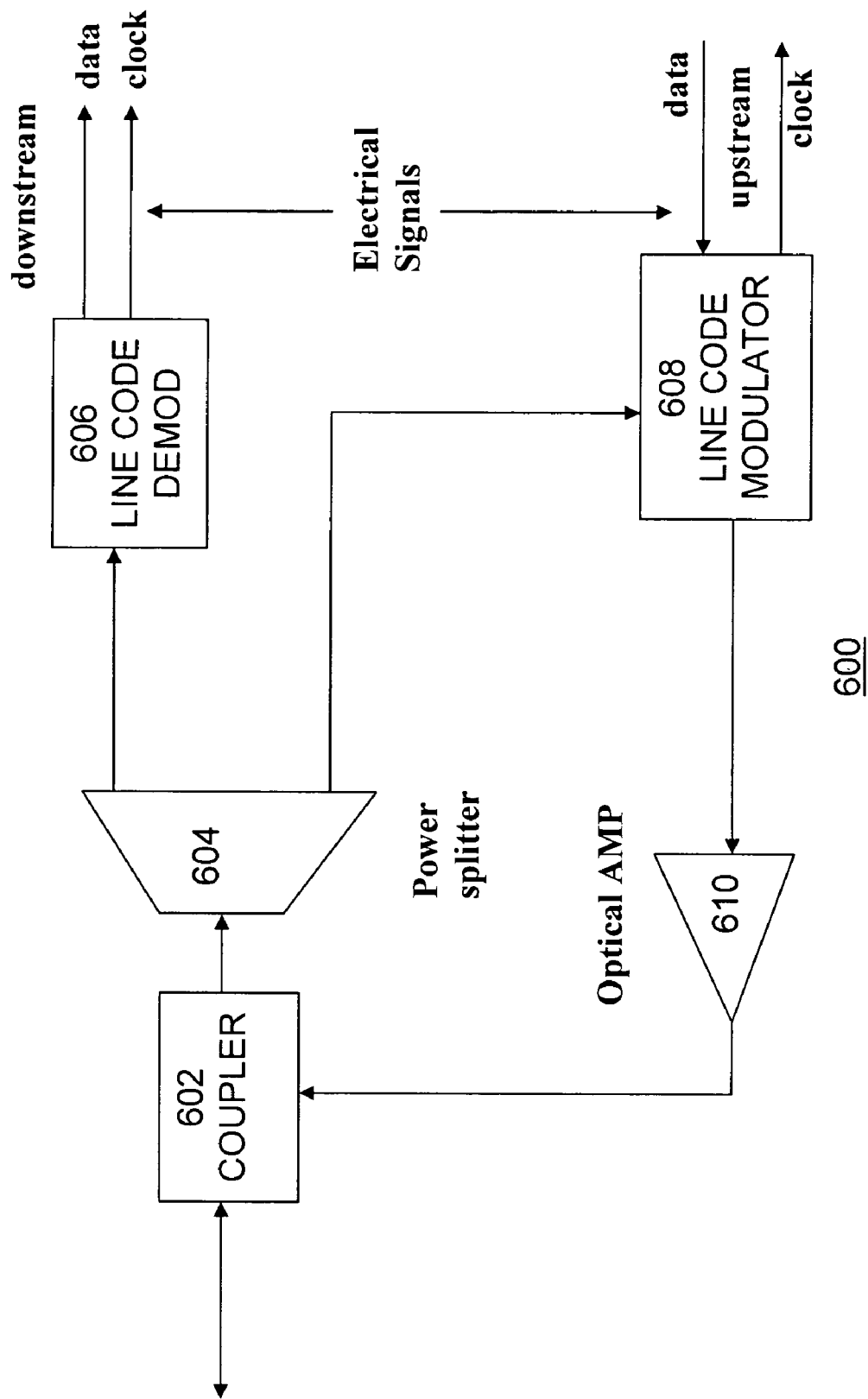
FIG. 6a is an exemplary block diagram of optical and electrical components in an ONU that that may be used to implement the present invention.

Turning briefly to FIG. 6a, an example of optical and electrical components in an ONU 600, in which the modulation—remodulation technique may be implemented, is shown. The ONU shown in FIG. 6a operates in conjunction with the embodiment of the OLT shown in FIG. 5. ONU 600 includes optical coupler 602, optical power splitter 604, line code demodulator 606, line code modulator 608, and optical amplifier 610. The signal from the OLT is received over the optical fiber and input to optical coupler 602. The signal is input to optical power splitter 604, which transmits the signal to line code demodulator 606 and line code modulator 608. Line code demodulator 606 demodulates the optical signal and extracts the downstream data and clock signals from the optical signal. The downstream data and clock signals are output from line code demodulator 606 as electrical signals.

Line code modulator 608 remodulates the optical signal with upstream data according to the line code modulation scheme shown in FIG. 4, or another equivalent scheme. The upstream data is input to line code modulator 608 as an electrical signal. Line code modulator 608 syncs to the downstream optical line code, then multiplies signal by upstream electrical bits (1 or 0). Thus, multiplying the downstream line code (01 or 10) by two periods of "0" (00) results in upstream modulation of "00". Likewise, multiplying the downstream line code (01 or 10) by two periods of "1" (11) results in upstream modulation of "01" or "10". Accurate phase alignment is required for upstream modulation.

The remodulated optical signal is input to optical amplifier 610, which amplifies the optical signal and outputs the signal to coupler 602. Coupler 602 couples the amplified remodulated signal onto the optical fiber for transmission to the OLT.

Returning to FIG. 5, the upstream, remodulated signal is received at coupler 512, which outputs the upstream signal to lambda demultiplexer 514. Lambda demultiplexer 514 separates the signal into a plurality of narrow wavelength remodulated signals. Each modulated narrow wavelength signal is input to an optical demodulator/CDR 516-1 to 516-K, where the data modulated onto the signal is detected. Each photodetector outputs an electrical signal carrying the data stream extracted from its input modulated narrow wavelength signal.

There are additional considerations related to the modulation-remodulation example described above. At the end of a received frame, a training interval is provided, which is a fixed downstream 1,0,1,0 . . . pattern. The training interval is a small fraction in bandwidth of the frame payload. Consistent with the normal payload, each "0" is a (0,1) at double line rate and each "1" is a (1,0) at double line rate. During the training interval, the ONU sends upstream a 1,0,1,0 . . . pattern. Consistent with normal payload, each 1 is a full period 1, each 0 is a full period 0. The receiving framer identifies the portion of time dedicated to the training interval.

Figure 6B:
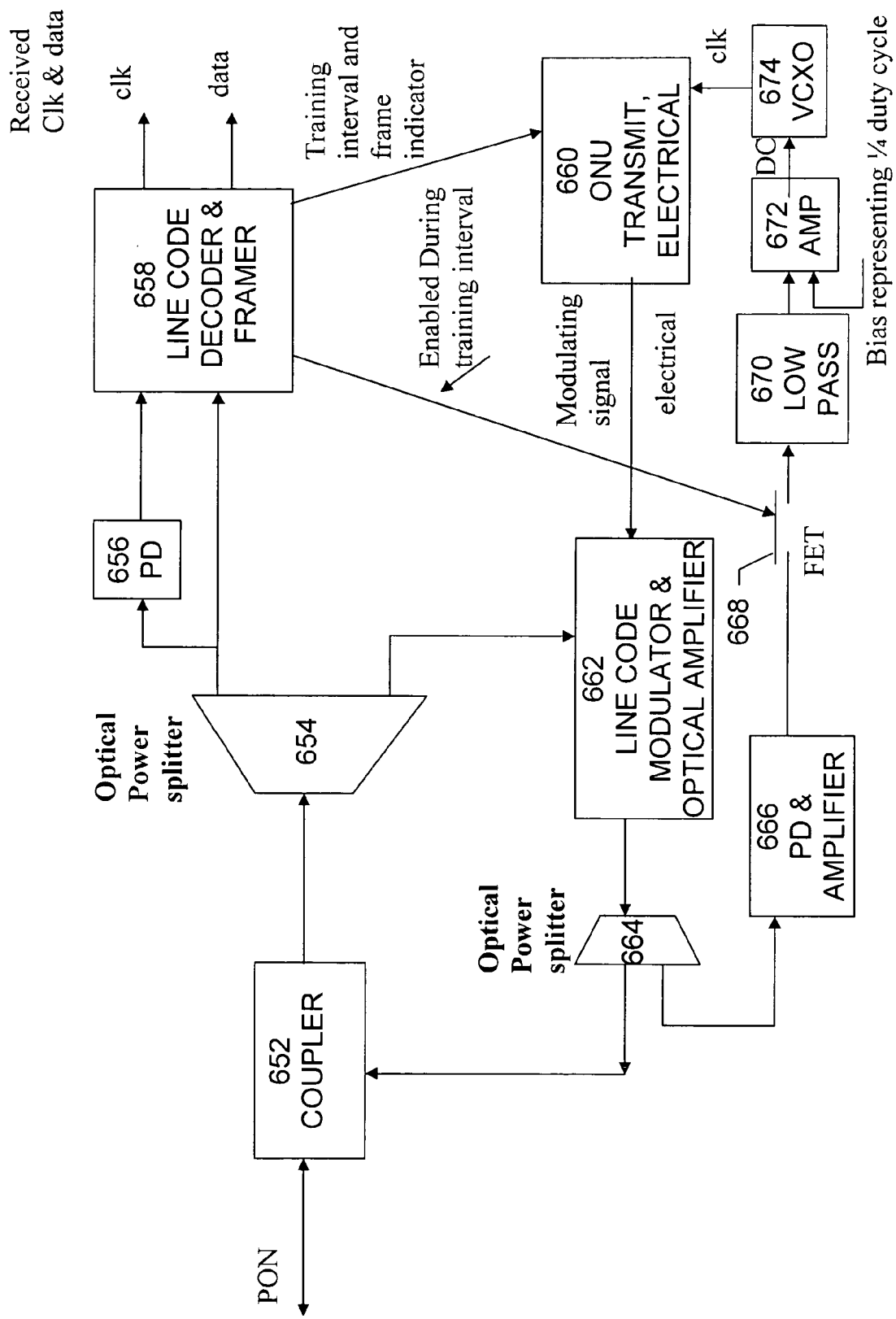
FIG. 6b is an exemplary block diagram of optical and electrical components in an ONU that that may be used to implement the present invention.

An example of ONU circuitry 650 that can provide the accurate phase alignment that is required for upstream modulation is shown in FIG. 6b. ONU circuitry 650 includes optical coupler 652, optical power splitter 654, photodetector 656, line code decoder and framer 658, ONU transmit electrical circuitry 660, line code modulator and optical amplifier 662, optical power splitter 664, photodetector and amplifier 666, field-effect transistor (FET) 668, low pass filter 670, DC amplifier 672, and voltage-control crystal oscillator (VCXO) 674. The operation of ONU 650 is similar to that of ONU circuitry 600, shown in FIG. 6a, with additional functionality. As shown in FIG. 6b, during the training interval, a sampling FET 668 is turned on, so as to pass the recovered electrical signal from the line code modulator 662 (via the photo detector 666). The sampled signal is filtered by a low pass filter 670, such that the DC output of the filter is a measure of the duty cycle of the optical pulses. The filter's electrical output is then amplified and fed to a VCXO 674 to create a phase lock loop.

Figure 6C:
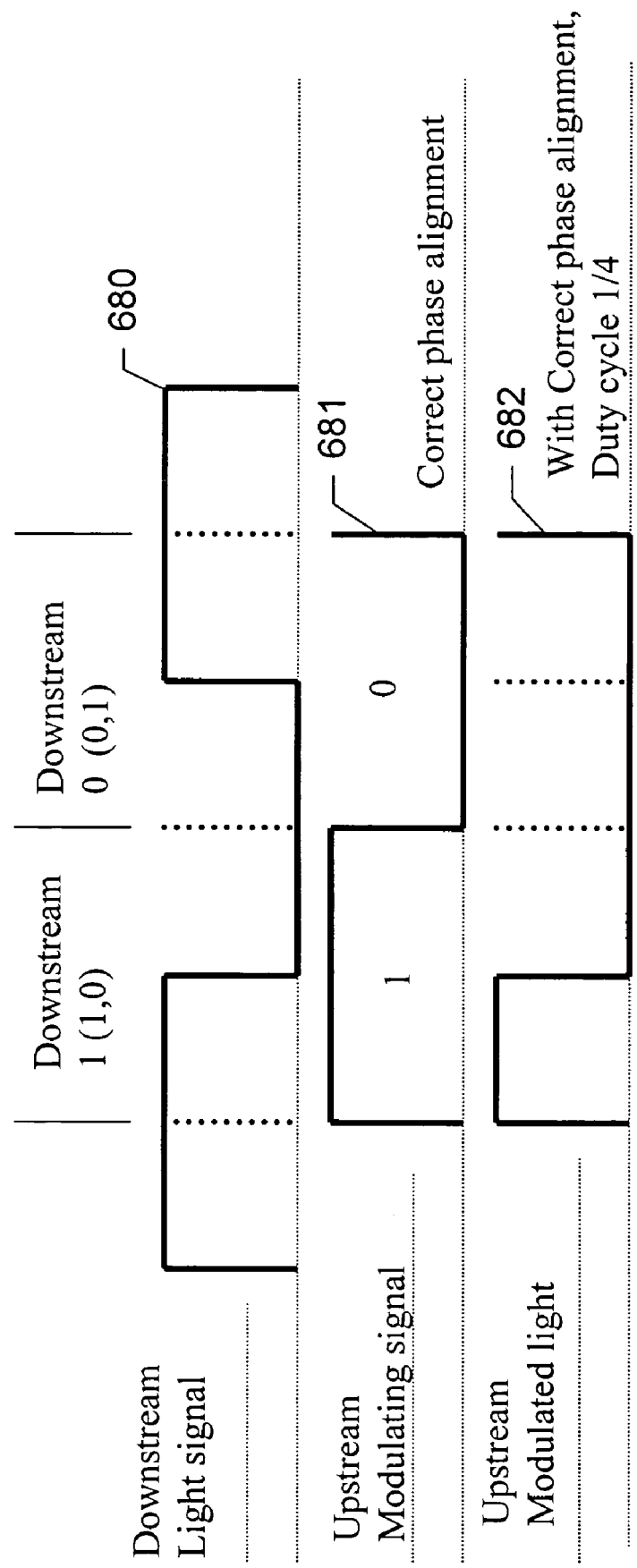
FIG. 6c is an exemplary illustration of a downstream training signal used for phase locking in an embodiment of the present invention.

Referring briefly to FIG. 6c, an example of a downstream training signal 680 is shown. In this example, downstream training signal 680 includes a series of 1s and 0s, which is a square wave of 50% duty cycle. An upstream modulating signal 681, which, in this example, is in correct phase alignment with the downstream training signal 680, is shown. The downstream training signal 680 is modulated (anded) with the upstream modulating signal 681 to form upstream modulated signal 682. With upstream modulating signal 681 in correct phase alignment with the downstream training signal 680, upstream modulated signal 682 has a duty cycle of 25%.

Figure 6D:
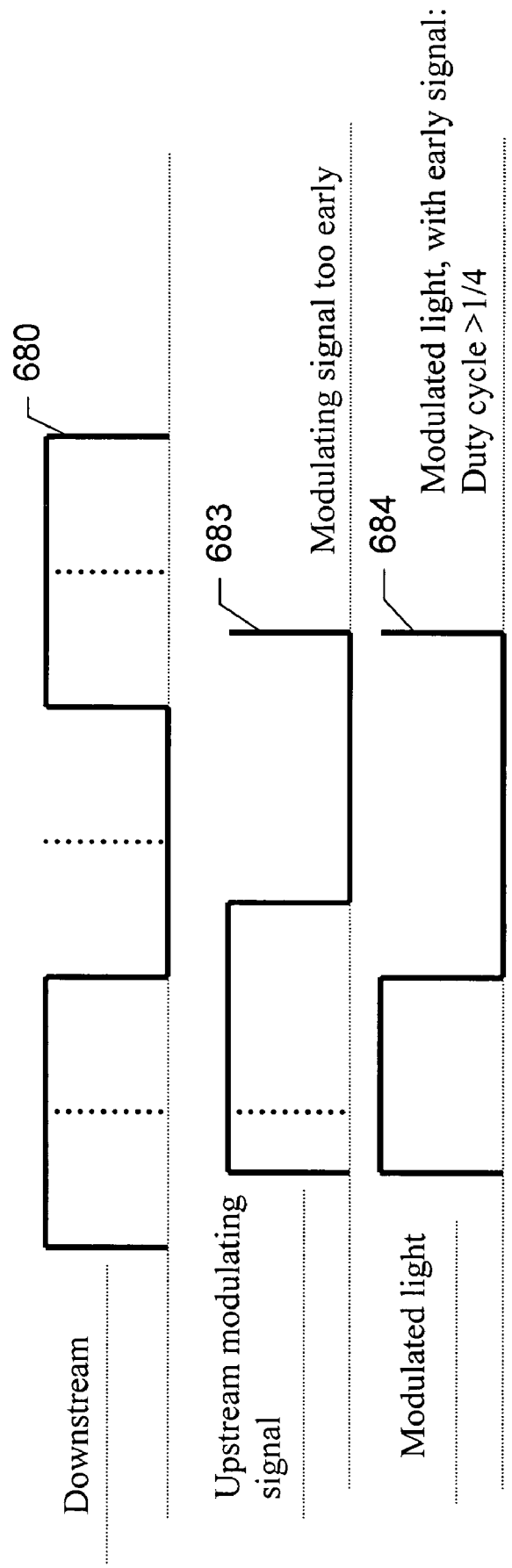
FIG. 6d is an exemplary illustration of a downstream training signal used for phase locking in an embodiment of the present invention.

The DC output of low pass filter 670 is a measure of the duty cycle of the optical pulses of upstream modulated signal 682. For example, referring to FIG. 6d, upstream modulating signal 683 is early relative to downstream training signal 680. When downstream training signal 680 is modulated with upstream modulating signal 683, the resulting upstream modulated signal has a duty cycle greater than 25%. Alternatively, referring to FIG. 6e, upstream modulating signal 685 is late relative to downstream training signal 680. When downstream training signal 680 is modulated with upstream modulating signal 683, the resulting upstream modulated signal has a duty cycle less than 25%. In either case, the feedback loop is designed to drive the duty cycle to ¼ during the training interval, thereby assuring phase alignment for the re-modulation.

Between training intervals, the FET 668 is turned off, such that the filter retains its DC value during the rest of the frame. The total phase control can optionally utilize the following: analog to digital converter, digital processor, and digital to analog converter. This could be used between the filter 670 output and the VCXO 674, or between the DC AMP 672 output and the VCXO 674.

As described above, the modulation performed in the OLT varies in different embodiments of the present invention. In one embodiment, the narrow wavelength signal is not modulated 100% of the time, but rather, unmodulated or continuous-wave (CW) portions of the narrow wavelength signal may be output from the OLT. The unmodulated portions of the narrow wavelength signal are modulated by the ONU and transmitted to the OLT. The operation of this embodiment may be termed "ping-pong". An example of the operation of the ping-pong technique is shown in FIG. 7. In this example, the OLT transmits a burst of modulated optical signal followed by a period of unmodulated optical signal. The optical signal is received by the ONU, which demodulates the modulated portion of the optical signal and extracts the downstream data, and which modulates the unmodulated portion of the optical signal with upstream data, and transmits the upstream modulated optical signal to the OLT.

In the example shown in FIG. 7, an effective data rate of 310 Mbs in each of the upstream and downstream directions is achieved with the use of transmission bursts at 622 Mbs for one half of the time. It is to be noted that these rates and timings are merely examples, the present invention is not limited to these rates and timings. Rather, the present invention contemplates any and all rates and timings for data transmission. For example, other transmission duty cycles are possible and may be advantageous for various reasons, such as to reduce the effect of reflections on the system performance.

As shown in FIG. 7, the OLT transmits a burst of modulated optical signal 702. In this example, the burst includes 8 STS3 frames of data transmitted at a 622 Mbs rate. This burst lasts 250 μS. The OLT then transmits a period 704 of unmodulated optical signal, which lasts 250 μS. The unmodulated optical signal 704A is received at the ONU at a time that is dependent upon the length of the optical fiber connecting the OLT and the ONU, and upon the time delays of the other optical components in the path, such as lambda multiplexers and demultiplexers, optical power splitters, couplers, circulators, etc. The ONU then modulates the unmodulated optical signal 704A and transmits the modulated upstream signal 704B to the OLT. There is some time delay in the optical path in the ONU and time delay in the return path back to the OLT. After this total path delay, the ONU burst 706 is received at the OLT.

Figure 8:
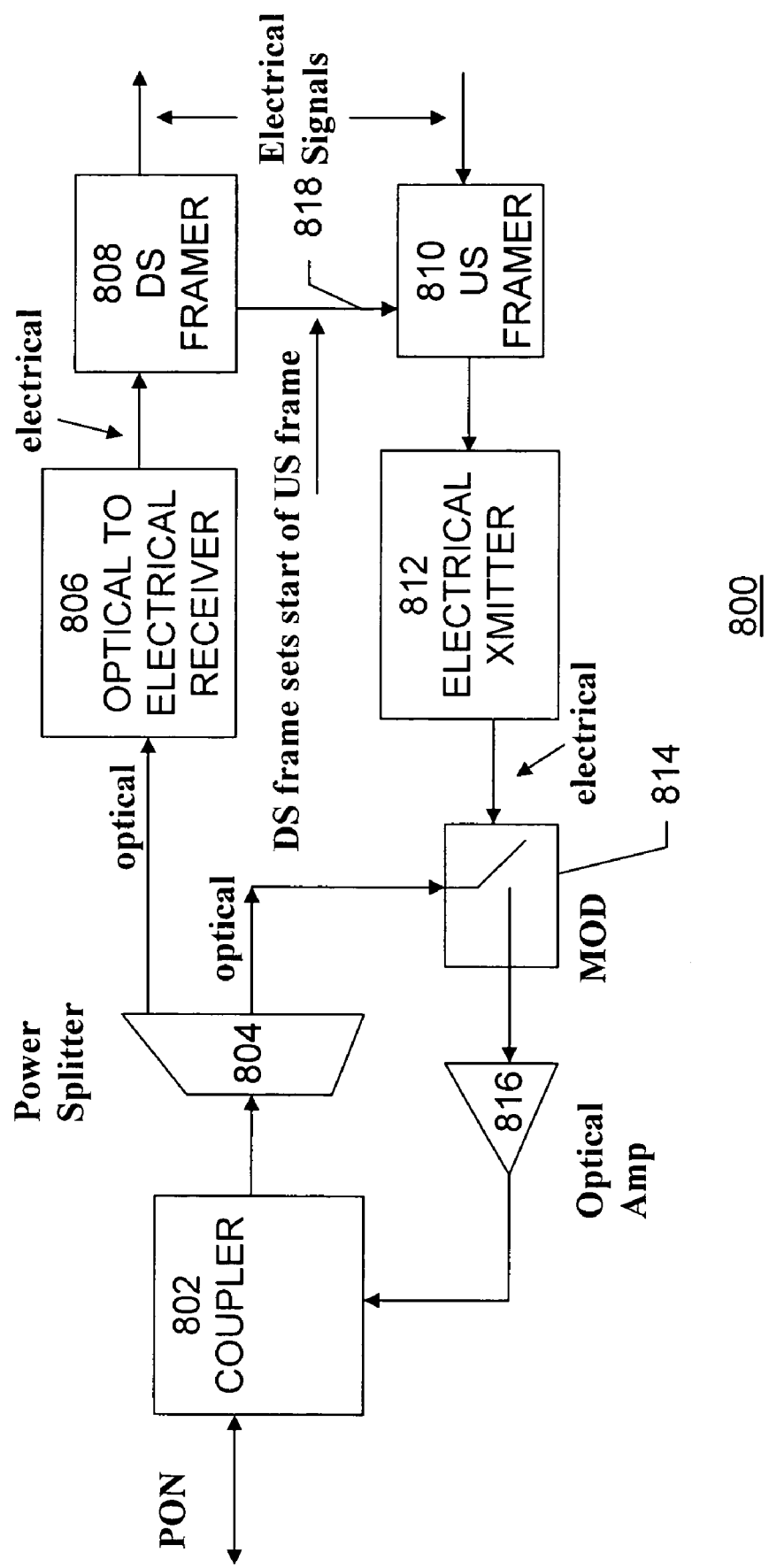
FIG. 8 is an exemplary block diagram of optical and electrical components in an ONU that that may be used to implement the present invention.

This embodiment assumes the optical return loss as seen by an OLT is not severe enough to prevent reliable detection of desired the ONU upstream optical signal, and similarly reflections as seen at the ONU are not severe enough to prevent reliable detection of the OLT downstream signal The ping-pong technique may be implemented in the embodiment of the present invention shown in FIG. 1b. Likewise, the ping-pong technique may be implemented in the embodiment of the present invention shown in FIG. 8, which is an exemplary block diagram of optical and electrical components in ONU 800.

ONU 800 includes coupler 802, optical power splitter 804, optical to electrical receiver 806, downstream framer 808, upstream framer 810, electrical transmitter 812, optical modulator 814, and optical amplifier 816. The optical signal from the OLT is input to coupler 802 and thence to optical power splitter 804, which transmits the signal to optical to electrical receiver 806 and optical modulator 814. Optical to electrical receiver 806 demodulates the optical signal and extracts the downstream data and clock signals from the optical signal. The downstream data and clock signals are output from optical to electrical receiver 806 as electrical signals. These electrical signals are input to downstream framer 808, which detects the start and/or end of the downstream frames and outputs a timing signal 818 that is used by upstream framer 810 to set the start of the upstream frames. Upstream data is input to upstream framer 810 and assembled into frames in accordance with the timing indicated by signal 818. At the appropriate time, the upstream frames are input to electrical transmitter 812, which drives the electrical input of optical modulator 814.

Optical modulator 814 modulates the unmodulated optical signal from optical power splitter 804 with upstream data as framed by and at the time controlled by upstream framer 810. The upstream data is input to optical modulator 814 as an electrical signal. The modulated optical signal is input to optical amplifier 816, which amplifies the optical signal and outputs the signal to coupler 802. Coupler 802 couples the amplified remodulated signal onto the optical fiber for transmission to the OLT.

Figure 9:
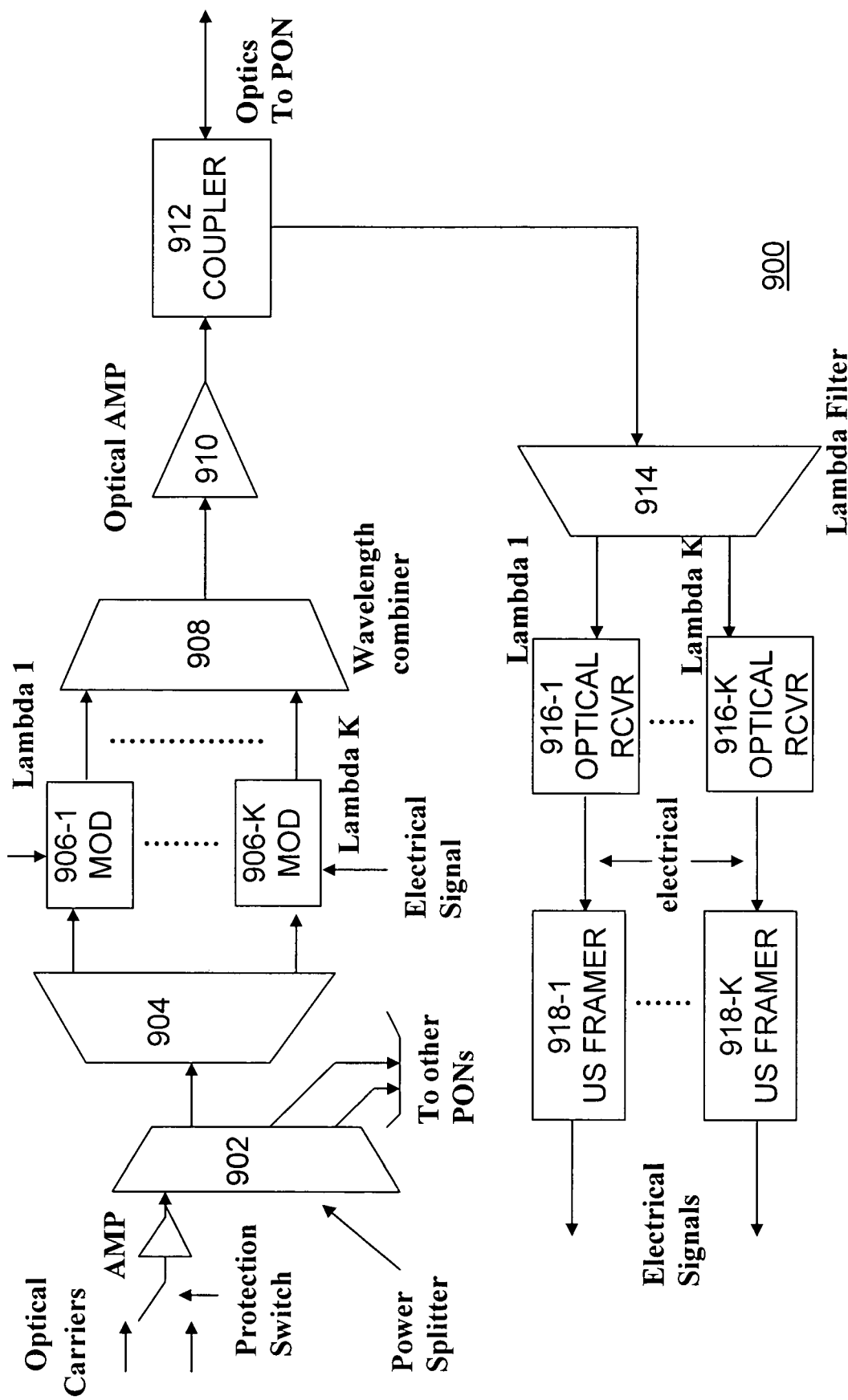
FIG. 9 is an exemplary block diagram of optical and electrical components in an OLT that that may be used to implement the present invention.

An example of optical and electrical components in an OLT 900, in which the ping-pong technique may be implemented, is shown in FIG. 9. OLT 900 includes an optical power splitter 902, a lambda demultiplexer 904, a plurality of optical modulators 906-1 to 906-K, a lambda multiplexer 908, an optical amplifier 910, an optical coupler 912, a lambda demultiplexer 914, a plurality of optical receivers 916-1 to 916-K, and a plurality of upstream framers. An unmodulated WDM signal (including a plurality of optical carriers) is input to optical power splitter 902, which splits the WDM signal into a plurality of WDM signals, each of which may be used by a particular PON. One or more optical amplifiers may be used to amplify the WDM signal, if higher WDM signal amplitude is needed for a particular application. In addition, since the WDM signal is provided to multiple PONs, a protection switch is included to provide switching between the working and protect optical WDM carriers.

The unmodulated WDM signal is input to lambda demultiplexer 904, which separates the signal into a plurality of narrow wavelength signals. Each narrow wavelength signal is input to an optical modulator 906-1 to 906-K, where it is modulated with data to be transmitted over the PON. A modulated narrow wavelength signal is output from each optical modulator 906-1 to 906-K and input to lambda multiplexer 908. These may be termed the OLT modulated signals. The input OLT modulated signals are multiplexed in lambda multiplexer 908 to form a modulated WDM signal. This may be termed the OLT WDM signal. The OLT WDM signal is output from lambda multiplexer 908 and input to optical amplifier 910, where the signal is amplified for transmission over the optical fiber. The amplified signal is input to optical coupler 912, where it is coupled onto the optical fiber for transmission to the ONU.

The upstream modulated signal is received at coupler 912, which outputs the upstream signal to lambda demultiplexer 914. Lambda demultiplexer 914 separates the signal into a plurality of narrow wavelength remodulated signals. Each modulated narrow wavelength signal is input to an optical receiver 916-1 to 916-K, where the data modulated onto the signal is detected. Each photodetector outputs an electrical signal carrying the data stream extracted from its input modulated narrow wavelength signal.

Each electrical signal carrying the data stream extracted from its input modulated narrow wavelength signal is input to an upstream framer, which detects the start and/or end of the upstream frames and outputs the data in these frames as electrical signals. In the ping-pong technique, the OLT and ONU bursts require preambles for clock recovery and start of burst detection. Once the OLT acquires burst start, it starts looking for burst start in the next frame a few microseconds before the expected start of burst. This reduces the likelihood of false sync detection.

Figure 10:
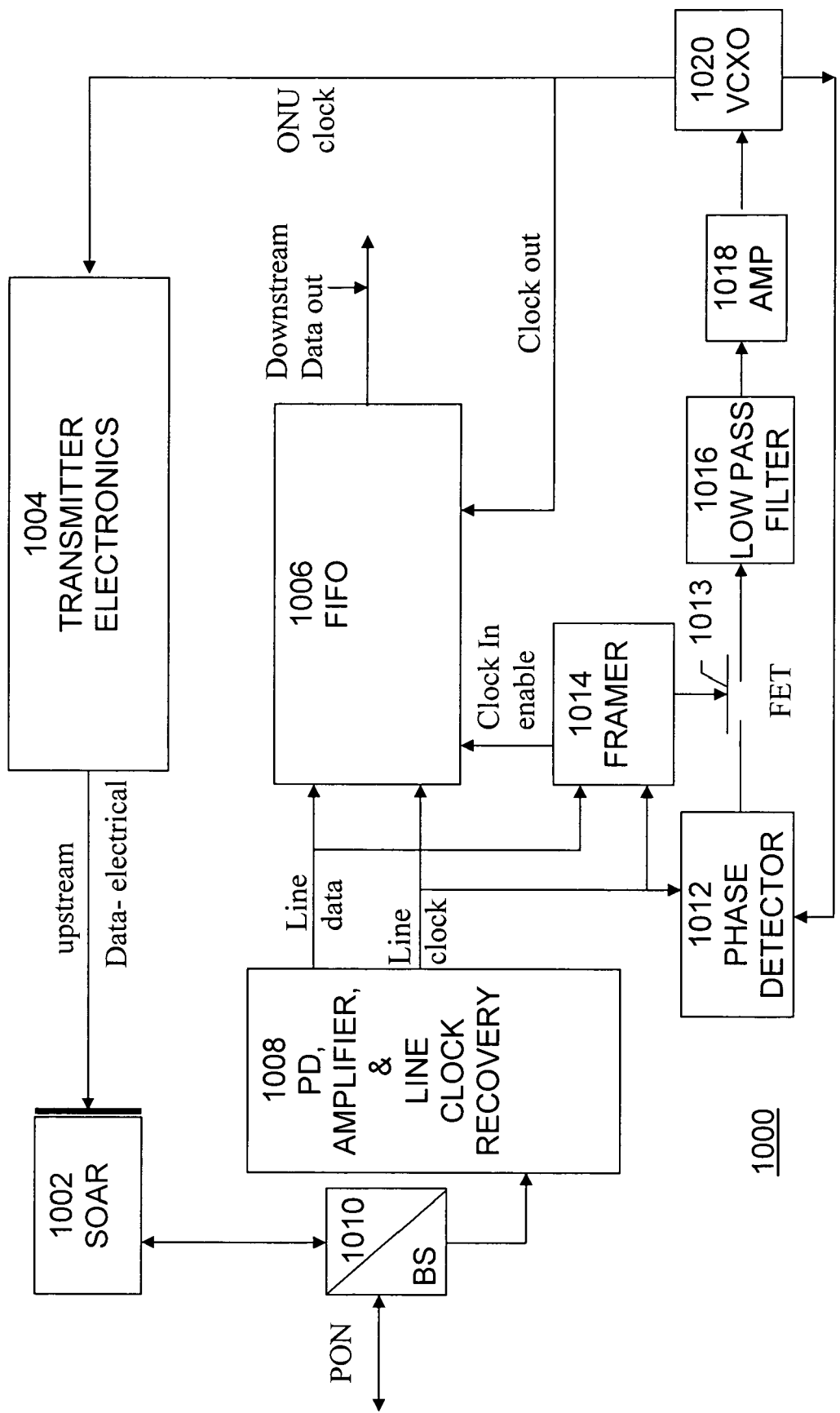
FIG. 10 is an exemplary block diagram of optical and electrical components in an ONU that that may be used to implement the present invention.

There are additional considerations related to the ping-pong example described above. In particular, it is preferred that the data clock of the downstream data is recovered at the ONU and used as the data clock for the upstream data as well. In order to accomplish this, a circuit such as that shown in FIG. 10 may be used. An example of ONU clock recovery and holdover circuitry 1000 is shown in FIG. 10. The circuitry shown in FIG. 10 may be used in conjunction with the ONU circuitry shown in FIG. 1*b*, or with some minor modifications, with the ONU circuitry shown in FIG. 9.

ONU block diagram including clock recovery and holdover circuitry 1000 includes SOAR device 1002, transmitter electronics 1004, first-in, first-out (FIFO) buffer 1006, photodetector, amplifier, and line clock recovery circuitry 1008, beam splitter 1010, phase detector 1012, FET 1013, framer 1014, low pass filter 1016, amplifier 1018, and VCXO 1020.

Downstream data passes through beam splitter 1010 to photo detector, amplifier, and line clock recovery circuitry 1008. The line clock recovery function may be performed, for example, by a wideband phase-locked loop (PLL). Photo detector, amplifier, and line clock recovery circuitry 1008 has electrical outputs including a line data output and a line clock output. The line data output and a line clock output are both input to FIFO 1006 and framer 1014, while the line clock output alone is input to phase detector 1012. The output of phase detector 1012 is fed through a FET 1013 to low pass filter 1016. FET 1013 is controlled by framer 1014 so that the ONU clock generation loop only functions while a downstream burst is received. Between downstream bursts, FET 1013 is opened to allow holdover of the state of the ONU clock loop. The VCXO 1020 output is a continuous ONU clock that traces its reference to the clock rate of the downstream burst. This clock is used to read out downstream data from the FIFO 1006. This clock is also clock for transmitter electronics 1004. It is possible to optionally utilize the following: analog to digital converter, digital processor, and digital to analog converter. This could be used between the low pass filter 1016 output and VCXO 1020, or between the subsequent amplifier 1018 and the VCXO 1020. The transmitter electronics 1004, using the ONU clock, outputs electrical data to modulate the SOAR device 1002, which sends modulated light upstream via the beam splitter 1010.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus comprising:
   a plurality of optical carrier generators, each optical carrier generator outputting an unmodulated optical carrier at a different wavelength;
   an optical multiplexer to combine the plurality of unmodulated optical carriers to form an unmodulated wave division multiplexed optical carrier; and
   an optical power splitter having a plurality of outputs, each output connectable to an optical line termination unit to transmit the unmodulated wave division multiplexed optical carrier over an optical distribution network to at least one optical network unit, the optical power splitter to split the unmodulated wave division multiplexed optical carrier to form a plurality of unmodulated wave division multiplexed optical carriers.

2. The apparatus of claim 1, wherein each optical carrier generator comprises a narrowband laser.

3. The apparatus of claim 2, further comprising an optical amplifier to amplify at least one of the plurality of wave division multiplexed optical carriers.

4. The apparatus of claim 3, further comprising a protection switch to provide switching between working and protect optical WDM carriers.

5. The apparatus of claim 4, wherein at least some of the optical line termination unit are in separate physical enclosures.

6. The apparatus of claim 1, wherein each optical line termination unit is to modulate at least one of the plurality of unmodulated wave division multiplexed optical carriers.

7. The apparatus of claim 1, wherein each optical line termination unit is to transmit the unmodulated wave division multiplexed optical carrier for a portion of the time and to transmit a modulated wave division multiplexed optical carrier for a portion of the time.

\* \* \* \* \*